Patented Oct. 6, 1936

2,056,575

UNITED STATES PATENT OFFICE 2,056,575

MANUFACTURE OF BLEACHED DRY DEXTRINE COMPOSITION

Alfred A. Haldenstein, North Plainfield, N. J., assignor to National Adhesives Corporation, New York, N. Y., a corporation of Delaware No Drawing. Application May 11, 1933, Serial No. 670,513

1 Claim. (Cl. 127—32)

This invention relates to the manufacture of a light-colored dry adhesive or glue base, and has particular reference to the manufacture of a bleached commercially dry dextrine composition.

The manufacture of adhesive solutions made by dissolving dextrine and a boron compound such as borax or boric acid in water, the boron compound acting to cause the dextrine to dissolve more perfectly and remain in solution, is well known. It is also known that such adhesive solutions, normally of dark brown color, may be rendered clearer and lighter by adding hydrogen peroxide to the solution. Such manufacture of dextrine adhesives is set forth in the U. S. Letters Patents to Higgins No. 466,238 and No. 466,239, granted Feb. 2, 1897. In the making of this adhesive as set forth in these patents, the dextrine is first dissolved, preferably in hot or boiling water, the solution obtained is then permitted to cool, and the hydrogen peroxide is then added, the mucilage obtained being then allowed to stand for several days or weeks, when it will become ready for bottling or use. When borax or boric acid is added to the dextrine in making the solution, the action of the peroxide is stated as being much more effective, and almost all the dextrine is held in a permanent transparent solution.

The prime object of my present invention is directed to improvements in the manufacture of these light-colored dextrine adhesives (or equivalent starch conversion products) whereby the dextrine and hydrogen peroxide are made into a substantially dry adhesive mix instead of into a solution. This substantially dry adhesive mix or glue base is either water soluble or sufficiently colloidal so as to disperse in water to produce an apparent solution, the solution yielding a liquid glue which is light in color upon being formed and which can consequently be used as soon as the dry mix is completely dissolved.

I have found that a commercially dry starch conversion product such as dextrine may be intimately mixed with a solution of hydrogen peroxide in a dispersed phase so as to produce a bleached dextrine in comminuted or dry form which may be packaged or stored for subsequent sale or use, and which when desired for use may be dissolved in water to produce a light-colored adhesive solution. A boron compound, and particularly borax, may be added to the adhesive mix or glue base at any time prior to the dissolving step, and preferably is added in the dry mixing operation after the dextrine has been intimately mixed with the hydrogen peroxide in its dispersed phase. The practice of this process, and in the manners hereinafter set forth, and the obtaining of the product thereof are the more particular objects of my present invention.

The manufacture of the present invention is preferably practiced as follows:

A starch conversion product such as dextrine is intimately mixed with a solution of hydrogen peroxide in a dispersed phase. In accordance with one method a 30% solution commercially known as "Albone C" manufactured by the Roessler Hasslacher Division of the Du Pont company is found desirable for this purpose. To produce the dispersion of this peroxide solution, it is preferably sprayed in the form of a fine mist into the dextrine powder, which latter is subjected to continuous agitation. The condition of the spray and the speed of mixing are such as to obviate the formation of liquid globules, and thus avoid local dissolving of the dextrine and the consequent formation of lumps, the result being the obtaining of a uniformly comminuted mix of the dextrine and the hydrogen peroxide, with the latter in a dispersed phase. In accordance with another method, the dispersion of the hydrogen peroxide solution in the mix may be accomplished by dissolving or diluting a hydrogen peroxide solution in a dextrine non-solvent and by mixing the same with the dextrine. Such a dextrine non-solvent is, for example, glycerin. The result obtained is here also a uniformly comminuted mix of the dextrine and the hydrogen peroxide, with the latter in a dispersed phase, the dispersion being made possible because of the insolubility of the dextrine in the glycerin. The amount of hydrogen peroxide solution used is, in either event, insufficient to alter essentially the degree of fineness or powdered condition of the dextrine powder.

Boron compounds may also be used in the process as aforesaid. Where boric acid is used as the boron compound, it may be first mixed with the dextrine or it may be mixed with the dextrine-hydrogen peroxide mix at a subsequent time. Where borax is used as the boron compound, it is desirably added in the mixing operation to the mix of the dextrine and the peroxide after these have been thoroughly incorporated together; this is preferred first because the presence of the borax (with its solution accelerating effect on dextrine) when the dextrine is mixed with the hydrogen peroxide solution in dispersed phase would increase the undesired tendency to form lumps due to local solution effects, and second because the borax accelerates the decomposition of the peroxide and in its absence the peroxide may become thoroughly intermixed with the dextrine without having any large amount of decomposition of the peroxide take place.

The following is one of the examples of the application of the invention to the production of a light-colored British gum adhesive base which is cold water soluble:

10,000 pounds of normally dry British gum are subjected to a fine spray of hydrogen peroxide solution in a dry blending machine, the spraying operation being carried out over a period of several hours, for example 1½ to 3 hours. The preferred weight proportions used in this operation are about 100 parts of dextrine to about 1 part of "Albone C" solution, the latter being desirably diluted with about 1½ parts of water. After the dextrine has been completely sprayed, the mixing is continued for about ½ an hour to make the mixture intimate and uniform. The blending machine is then charged with powdered borax, the latter being sprinkled slowly into the dextrine-hydrogen peroxide mix. The borax is preferably added in the customary amount, for example, of from 12 to 17% of the weight of the dextrine, the specific amount depending upon the raw material used and upon the amount of water absorption desired for the resulting product. The addition of the borax charge consumes about 2 hours. The final mix obtained is then discharged from the machine and bagged for storage or sale.

The proportions of hydrogen peroxide may be varied within some limits. Thus ½% of "Albone C" yields a very noticeable change in color, while a 1% proportion results in a dextrine very light in color. It is preferred to dilute this solution by the amount of water mentioned, and it is found unnecessary to increase the dilution beyond the proportion of water above specified. This, however, may be further controlled to predetermine the moisture content of the dextrine for the purpose hereinafter set forth. If the spray used is an air spray, provision should be made in the blending machine to remove the supply of air thus introduced. To retard dissociation of the hydrogen peroxide in the spraying step, the hydrogen peroxide solution may if desired be mixed with a small amount of any known stabilizing agent.

The hydrogen peroxide may be diluted in other than a water medium. For example, where envelope gums are produced, acetic acid may be used as the diluting medium. Other diluting agents, such for example as phosphoric acid, may also be used; in general solvents which will not be reacted upon by the hydrogen peroxide may be employed.

The following is an example of the application of the invention to the production of a light-colored envelope gum:

Ten thousand pounds of normally dry dextrine are mixed with hydrogen peroxide dissolved or diluted in a dextrine non-solvent such as glycerin. The weight proportions used may be about 100 parts of dextrine to about 2 parts of glycerin and one part of hydrogen peroxide, the hydrogen peroxide being preferably first admixed with the glycerin. The glycerin is inert in the resulting mix, and functions in the mixing operation to effect the desired dispersion of the hydrogen peroxide. The glycerin also serves to improve the adhesion and the working characteristics of the envelope gum in its use for the manufacture of envelopes and similar products.

I have found that the hydrogen peroxide thus incorporated in a dispersed form with the dextrine by either of the above examples rapidly acts on the dextrine, bleaching it before it is finally made up in a liquid glue, the bleaching thus taking place while the dextrine is in comminuted or substantially dry form. The moisture added by the spraying process apparently conditions the dextrine mix to effect this result. This bleaching action which takes place in the dry mix either during the mixing operation or during any storage period following the same is important in commerce, since the resulting liquid glue is light in color and clear in appearance upon mixing and can consequently be used as soon as completely dissolved. This is to be distinguished from prior art practice, where it was necessary to allow the liquid glue to stand for a period of time to permit the bleaching agent to act on the dextrine constituent of the solution. It is also to be distinguished from prior art use of a dry glue base in which a dry oxidizing agent such as perborate of sodium was incorporated, which base had to be kept in storage for an extended period of time to permit a sufficient moisture absorption to make the bleaching agent effective.

I have further found that by following my improved process several other important results are obtained. Dextrine bases of the prior art have a tendency to lump when mixed with water unless the dextrine has absorbed through aging a sufficiently high moisture content. Because of this tendency for fresh dextrine to lump, it was necessary to age the dextrine before mixing. Where a dextrine in dry form was mixed with a dry oxidizing agent such as perborate of sodium, as hereinbefore referred to, the aging of the glue base until sufficient moisture was absorbed from the air was also necessary to prevent the lumping. This meant that not only did large stocks have to be kept on hand, but furthermore the bags of dextrine could not be piled too compactly, otherwise the rate of moisture absorption would be so slow as to be impracticable. By the practice of my present process a solution of hydrogen peroxide is used and the concentration thereof can be so adjusted that by adding any desired amount of peroxide, any desired amount of moisture can be simultaneously added. Thus it is possible to use fresh dextrine, to make a glue base or dry adhesive mix therefrom, and to put the finished product immediately into commerce, thus saving on inventory, warehouse space and the like.

If desired, the usual alkaline agents such, for example, as sodium metaborate, may be used to modify the action of the borax on the dextrine. In the practice of my process this offers the advantage that the alkaline agent is independent of the bleaching agent and consequently can be adjusted to any degree that is required or desired for the particular glue base. Also if desired a mixture of boric acid and borax, or even boric acid alone, may be used as a subsequent modifying agent after the bleaching treatment; this also offers the same advantage due to the modifying agent being independent of the bleaching agent.

The practice of my process and the many advantages inherent therein and incident thereto will in the main be fully apparent from the above detailed description thereof. It will be understood that many variations may be made in the sequence of steps and in the character and proportions of the ingredients used. The dextrine employed may be any starch conversion product used in the manufacture of adhesive, sizes and the like. It is also contemplated that dry products derived from dextrine may be employed in my process; for example, cold water soluble glue obtained by dissolving or cooking dextrine in water, adding borax and then reducing the resulting product to a dry form by means of steam heated rolls may be employed. It will be further apparent that many other variations may be made without departing from the spirit of the invention defined in the following claim.

I claim:

The step in the method of making a water soluble substantially dry adhesive mix which consists in intimately mixing a dry starch conversion product with a solution of hydrogen peroxide, the solvent for the hydrogen peroxide being a non-solvent for the starch conversion product whereby the hydrogen peroxide is dispersed in the mixing step.

ALFRED A. HALDENSTEIN.